(12) United States Patent
Ganesan et al.

(10) Patent No.: US 12,706,784 B2
(45) **Date of Patent: *Aug. 11, 2026**

(54) DFE IMPLEMENTATION FOR WIRELINE APPLICATIONS

(71) Applicant: Texas Instruments Incorporated, Dallas, TX (US)

(72) Inventors: Raghu Ganesan, Bangalore (IN); Kalpesh Rajai, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,553

(22) Filed: Dec. 7, 2023

(65) Prior Publication Data

US 2024/0121139 A1 Apr. 11, 2024

Related U.S. Application Data

(60) Continuation of application No. 17/733,843, filed on Apr. 29, 2022, now Pat. No. 11,876,648, which is a division of application No. 17/200,593, filed on Mar. 12, 2021, now Pat. No. 11,336,490.

(30) Foreign Application Priority Data

Mar. 13, 2020 (IN) ............................ 202041010822

(51) Int. Cl.
*H04L 25/03* (2006.01)

(52) U.S. Cl.
CPC .. *H04L 25/03057* (2013.01); *H04L 25/03267* (2013.01)

(58) Field of Classification Search
CPC ......... H04L 25/03006; H04L 25/03019; H04L 25/03057; H04L 25/03254; H04L 25/03267
USPC ......... 375/232, 233, 346, 348; 708/322, 323
See application file for complete search history.

(56) References Cited

U.S. PATENT DOCUMENTS

| | | | |
|---|---|---|---|
| 7,263,123 | B2 | 8/2007 | Yousef |
| 7,440,497 | B2 | 10/2008 | Balan |
| 7,706,436 | B2 | 4/2010 | Zhidkov |

(Continued)

FOREIGN PATENT DOCUMENTS

| | | | | |
|---|---|---|---|---|
| CN | 108141419 A | * | 6/2018 | ....... H04L 25/03057 |
| CN | 108292512 A | | 7/2018 | |

*Primary Examiner* — Young T. Tse
(74) *Attorney, Agent, or Firm* — Xianghui Huang; Frank D. Cimino

(57) ABSTRACT

Disclosed embodiments include a decision feedback equalizer (DFE) comprising an N-bit parallel input adapted to be coupled to a communication channel and configured to receive consecutive communication symbols, a first DFE path including a first path input configured to receive communication symbols, and a first adder having a first adder input coupled to the first path input. There is a first DFE filter having outputs responsive to the first DFE filter inputs, the outputs coupled to the second adder input. The DFE includes a first path having a first slicer and a first multiplexer, a first path multiplexer output, and a second DFE path including a second path input configured to receive a second communication symbol, a second adder, a second DFE filter, a second slicer, and a second multiplexer.

19 Claims, 6 Drawing Sheets

(56) References Cited

U.S. PATENT DOCUMENTS

| | | | |
|---|---|---|---|
| 7,715,474 | B2 * | 5/2010 | Park .................. H04L 25/03146 375/233 |
| 8,301,036 | B2 | 10/2012 | He |
| 8,848,774 | B2 | 9/2014 | Zhong |
| 8,923,382 | B2 | 12/2014 | Ito |
| 9,077,574 | B1 | 7/2015 | Healey |
| 9,215,108 | B2 | 12/2015 | Amamiya |
| 9,367,385 | B2 * | 6/2016 | Cyrusian ........... H04L 25/03057 |
| 10,038,575 | B1 | 7/2018 | Steffan |
| 2005/0190832 | A1 | 9/2005 | Ibragimov et al. |
| 2006/0029126 | A1 | 2/2006 | Chang |
| 2012/0057627 | A1 | 3/2012 | Chan et al. |
| 2014/0140389 | A1 | 5/2014 | Chen |
| 2014/0169440 | A1 | 6/2014 | Kotagiri et al. |
| 2014/0281845 | A1 | 9/2014 | Cyrusian |
| 2015/0256363 | A1 * | 9/2015 | Shvydun ............. H04L 25/4917 375/233 |
| 2015/0256364 | A1 | 9/2015 | Mobin et al. |
| 2016/0218889 | A1 | 7/2016 | Zheng et al. |
| 2016/0277220 | A1 | 9/2016 | Liu |
| 2017/0134189 | A1 | 5/2017 | Sadeghi-Emamchaie |
| 2017/0171006 | A1 | 6/2017 | Baecher |
| 2017/0373887 | A1 | 12/2017 | Ho |
| 2018/0097665 | A1 * | 4/2018 | Li ........................... H04L 69/28 |
| 2018/0136866 | A1 * | 5/2018 | Eugenio .................. G06F 11/22 |
| 2020/0252247 | A1 | 8/2020 | Palusa |
| 2021/0044461 | A1 | 2/2021 | Groen |

* cited by examiner 650
600
dfe_block_0
dfe_block_1
dfe_block_2
dfe_block_3
dfe_block_4
dfe_head_0
dfe_head_1
dfe_tail_early
dfe_tail
5-TAP
DFE FILTER
coeff_0
coeff_4
coeff_5
dline_5
dfe_block_0
dfe_head_0
dfe_head_1
dfe_tail
input_0
slicer_out_0
602
604
606
608
610
612
614
616
618
620
622
624
626
628
674

DFE IMPLEMENTATION FOR WIRELINE APPLICATIONS

REFERENCE TO RELATED APPLICATIONS

This patent is a continuation of U.S. patent application Ser. No. 17/733,843, filed Apr. 29, 2022, which is a division of U.S. patent application Ser. No. 17/200,593, filed Mar. 12, 2021, now U.S. Pat. No. 11,336,490, issued May 17, 2022, which claims priority to India Provisional Patent Application No. 202041010822, filed Mar. 13, 2020, which applications are hereby incorporated herein by reference.

BACKGROUND

Ethernet is a communication protocol for connecting computers together in local area networks, metropolitan area networks and wide area networks. Systems communicating over Ethernet divide a stream of data into shorter pieces called frames. Each frame contains source and destination addresses, and error-checking data.

To facilitate an exchange of information, commands and data, devices connected to the network incorporate a transceiver that acts as the bridge between the device and the network. The transceiver may incorporate a physical layer (PHY) device, a media access controller (MAC) and other devices such as clocks and power supplies. The PHY defines the means of transmitting raw data bits over a physical data link connecting network nodes. The major functions and services performed by the PHY include performing bit-by-bit or symbol-by-symbol data delivery over a physical transmission medium and providing a standardized interface to the transmission medium.

The proliferation of networked electronic devices has brought with it efforts to increase signaling speed while maintaining signal integrity. The core of a communication link consists of a transmitter that generates the signal, a channel that carries the signal, and a receiver that accepts the signal and processes it correctly. For accurate signaling between networked devices or components, the integrity of the signal needs to be maintained. From a physical layer standpoint, this means that if a “1” is sent down the channel from the transmitter, the receiver should determine that the received signal is a “1”. This is a fundamental challenge for data transmission system designs due to the various factors affecting signal integrity.

Signal integrity in data transmission systems is affected by a number of factors. In addition to random noise, atmospheric noise and man-made noise, there are deterministic factors that contribute to deteriorating signal integrity. Copper-based signal transmission is affected by the limited bandwidth of copper channels and crosstalk from adjacent channels. Optical signals are affected by frequency-independent loss of optical power and light dispersion as the signals travel down the fiber. Factors such as bandwidth limitations in copper and light dispersion in optical fibers result in inter-symbol-interference (ISI) at the receiver. Typically, ISI worsens as the data rate and the length of the channel increases. ISI is a primary factor limiting transmission distances over copper-based transmission channels and optical fiber at high data-rates (e.g., 10-Gb/sec). Efforts to compensate for ISI and maintain signal integrity have resulted in various transmitter-side and receiver-side technologies, including equalization.

Equalization is a process for conditioning an electrical signal to compensate for channel-induced ISI for the purpose of improving signal integrity. Linear and non-linear equalization techniques have been used. One non-linear equalization technique is known as decision-feedback equalization (DFE). In DFE, a delay element is introduced into the receiver circuitry and equalization values are combined with an input data stream to reduce the effects of ISI.

SUMMARY

The first disclosed embodiment includes a decision feedback equalizer (DFE) comprising an N-bit parallel input adapted to be coupled to a communication channel and configured to receive consecutive communication symbols transmitted at a rate of one symbol per cycle during a current clock cycle and each of previous (N−1) clock cycles. A first DFE path includes a first path input configured to receive a first one of the communication symbols, a first adder having a first adder input coupled to the first path input, a second adder input, and a first adder output, a first DFE filter having first DFE filter inputs and having first DFE filter outputs responsive to the first DFE filter inputs, wherein each first DFE filter input has one of three values and the first DFE filter outputs are coupled to the second adder input. Each first DFE filter output corresponds to a member of a set of all possible combinations of the first DFE filter inputs. A first slicer having first slicer inputs is coupled to the first DFE filter outputs. A first multiplexer having first multiplexer inputs is coupled to the first slicer outputs and has control inputs configured to select which of the first multiplexer inputs is connected to the first path multiplexer output. There is a second DFE path that includes a second path input configured to receive a second communication symbol that is next sequentially following the first communication symbol, a second adder having a third adder input is coupled to the second path input, a fourth adder input, and a second adder output. There is a second DFE filter having second DFE filter inputs and having second DFE filter outputs responsive to the second DFE filter inputs, wherein each second DFE input has one of three values, the second DFE filter outputs are coupled to the fourth adder input, and each second DFE filter output corresponds to a member of a set of all possible combinations of the second DFE filter inputs. There is a second slicer having second slicer inputs coupled to the second DFE filter outputs, and having second slicer outputs. Lastly, there is a second multiplexer having second multiplexer inputs coupled to the second slicer outputs, a second path multiplexer output, and having control inputs coupled to at least the first path multiplexer output, and configured to select which of the second multiplexer inputs is connected to the second multiplexer output.

Another example embodiment includes a decision feedback equalizer (DFE) comprising M sequential filter blocks of N taps each, where each block except the first block receives its inputs from the previous block, and where each block except the last block feeds its outputs to the next block as an input, and wherein each block except the first block includes an N-tap DFE filter having N multipliers configured to receive as inputs N symbols and N coefficients and multiply each of the N symbols by its respective coefficient and provide a block decision output on each clock cycle; and a first adder having (M−2) inputs coupled to the block decision outputs from the last (M−2) blocks, and having a tail output. The DFE includes a first block DFE filter having (N−1) multipliers configured to receive as inputs the symbols two through N and respective coefficients for symbols two through N, and multiply each of those symbols by its respective symbol coefficient and provide the products as first filter outputs, a multiplexer having multiplexer inputs coupled to the first filter outputs, and a multiplexer output, a current multiplier having a first input coupled to the first symbol, a second input coupled to a first symbol coefficient, and having a current multiplier output that is the product of the first symbol and the first symbol coefficient. The DFE also includes a second adder having a first input coupled to the multiplexer output and a second input coupled to the current multiplier output, and having a second adder output, a third adder having a third input coupled to the second adder output and a fourth input coupled to the block decision output of the second block, and having a third adder output. There is a fourth adder having a fifth input coupled to the tail output and a sixth input coupled to an input signal, and having a fourth adder output, a fifth adder having seventh input coupled to the fourth adder output and an eighth input coupled to the third adder output, and having a fifth adder output. Lastly, there is a slicer having a slicer input coupled to the fifth adder output, and having a slicer output.

Example embodiments also include a DFE comprising an N-tap DFE filter configured to receive N symbols and N coefficients as inputs and to provide a decision output on each clock cycle. There is a current multiplier having a first input coupled to a current symbol, a second input coupled to a current symbol coefficient, and having a current multiplier output that is the product of the current symbol and the current symbol coefficient. Also, there is a first adder having a first input coupled to the decision output and a second input coupled to the current multiplier output, and having a first adder output, a second adder having a third input coupled to the first adder output and a fourth input coupled to an input signal, and having a second adder output. Lastly, there is a slicer having a slicer input coupled to the second adder output, and having a slicer output.

Figure 1:
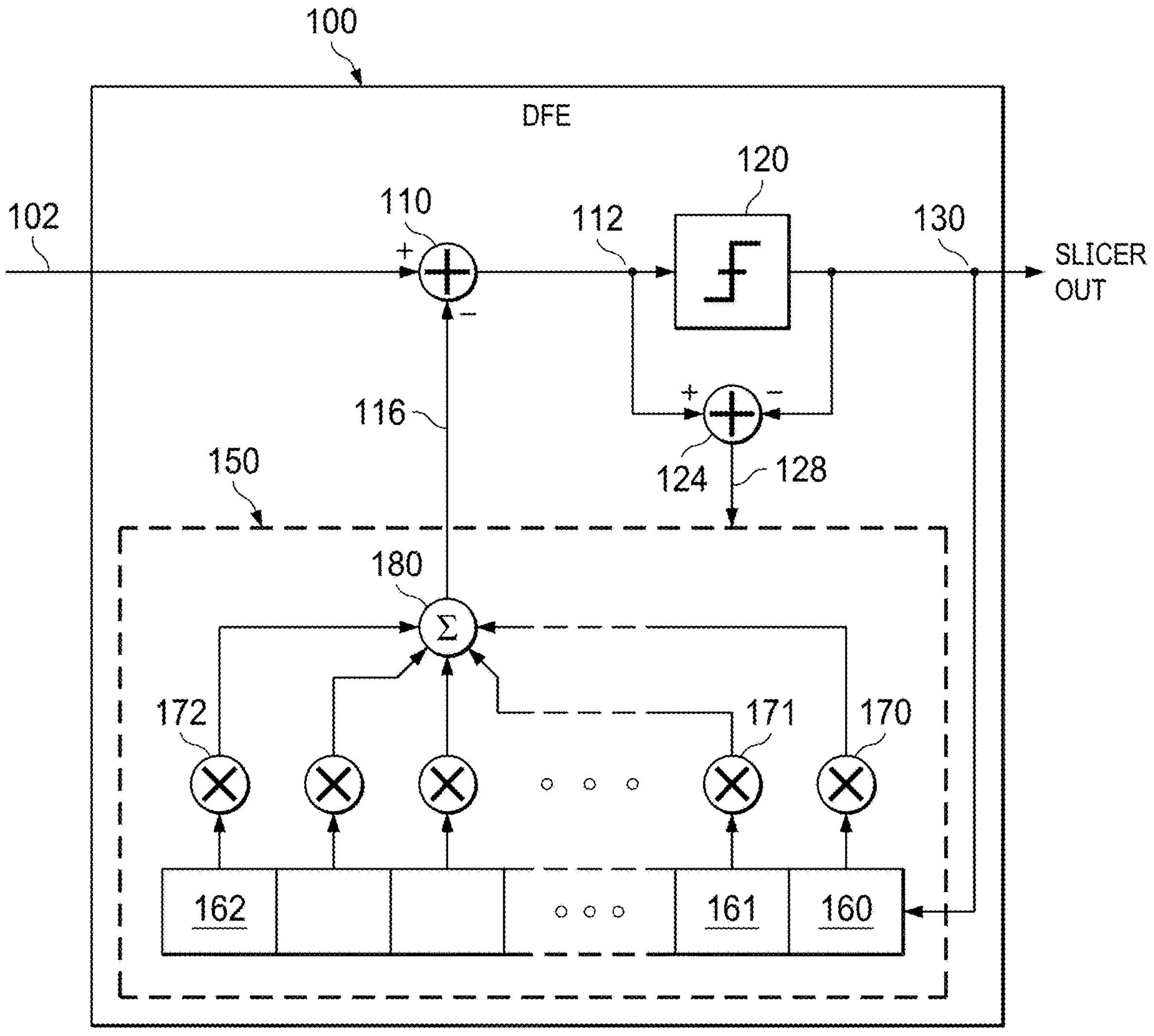
FIG. 1 is a block diagram illustrating an example decision feedback equalizer having a serial input.

The same reference numbers are used in the drawings to depict the same or similar (by function and/or structure) features. Details of one or more implementations of the present disclosure are set forth in the accompanying drawings and the description below. The figures are not drawn to scale and are provided merely to illustrate the disclosure. Specific details, relationships, and methods are set forth to provide an understanding of the disclosure. Other features and advantages may be apparent from the description and drawings, and from the claims.

DETAILED DESCRIPTION

A major challenge to maintaining signal integrity in communication channels is channel-induced ISI. In the ideal case, each symbol coming through the channel would be received with no inter-symbol-interference. However, as the symbols are transmitted through a high-speed communication channel, the symbols get smeared by lingering effects of previous symbols in the pipeline, and the symbol value received becomes a function of the previous symbols in the pipeline. A typical method of correcting for this smearing of the symbols is to implement DFE to the data received at the Ethernet PHY receiver. DFE can be implemented by estimating the ISI on the received signal, then subtracting the estimated ISI from the received signal. This can be accomplished by keeping a record of previous symbol values, multiplying those values by a determined weighting factor, and subtracting the result from the signal received on a symbol-by-symbol basis.

FIG. 1 is a block diagram illustrating an example DFE 100. DFE 100 includes adder 110, slicer 120 and DFE filter 150. Symbol data 102 is input to DFE 100 in a serial format. Symbol data 102 is combined with the output 116 from DFE filter 150 using adder 110. The output 112 of adder 110 is input to slicer 120.

The output 130 of slicer 120 is one of three levels: −1, 0 or 1. Slicer 120 makes the decision which of those three values to assign to a symbol based on the voltage level of the input 112 of slicer 120 and how that voltage level compares to a first threshold and to a second threshold. If the voltage level of input 112 is higher than the first threshold (e.g. 1.5V), slicer 120 assigns an output value of 1. If the voltage level is between the first threshold value and a second threshold value (e.g. −1.5V), slicer 120 assigns an output value of 0. If the voltage level of input 112 is lower than the second threshold, slicer 120 assigns an output value of −1. The output 130 of slicer 120 is subtracted from the input 112 of slicer 120 at adder 124, resulting in error signal 128.

The output 130 of slicer 120 is connected to register 160, which is the first of N registers. In some cases, each of the N sequential registers can be a flip-flop (e.g. D flip-flop). On the following clock cycle, the value that was in register 160 will be moved to register 161, and the value in register 160 will be replaced by the next value from output 130. A given data value will move sequentially on each clock cycle through the N registers starting from register 160 to register 161 and continuing on each successive clock cycle until it reaches the $N^{th}$ register 162.

Each of the N registers has a corresponding DFE coefficient that the value gets multiplied by. For example, the value in register 160 is multiplied by DFE coefficient 170, the value in register 161 is multiplied by DFE coefficient 171, and the value in register 162 is multiplied by DFE coefficient 172. Each of the DFE coefficients varies depending upon the weighting that the data value should be accorded. In many cases, the DFE coefficients may decrease the farther the sample is from the current sample (i.e. DFE coefficient 172<DFE coefficient 171<DFE coefficient 170).

The DFE coefficients can change as frequently as each clock cycle, but are updated less frequently in many example embodiments. The DFE coefficients are derived based on a least mean squares (LMS) error algorithm. The LMS logic block (not shown) receives error signal 128 as an input, applies the LMS error algorithm, and updates each of the DFE coefficients accordingly. Each of the products of register values and DFE coefficients is added together at adder 180. The output 116 of adder 180 represents the estimated ISI, and is then subtracted from the symbol data 102 using adder 110. The output 112 of adder 110 is input to slicer 120. The output 130 of slicer 120 is slicer out, the symbol decision output.

A challenge presented by the implementation of DFE 100 is the high clock rate required to advance the data symbols through the registers sequentially in order to meet the high data rate of gigabit Ethernet. In at least one example embodiment, a symbol rate (e.g. the clock rate used to clock registers 160, 161 and 162) of 750 MHz is required to support gigabit Ethernet using the implementation in DFE 100. One alternative for lowering the required clock rate to achieve the desired data throughput is to use a parallel DFE architecture.

Figure 2:
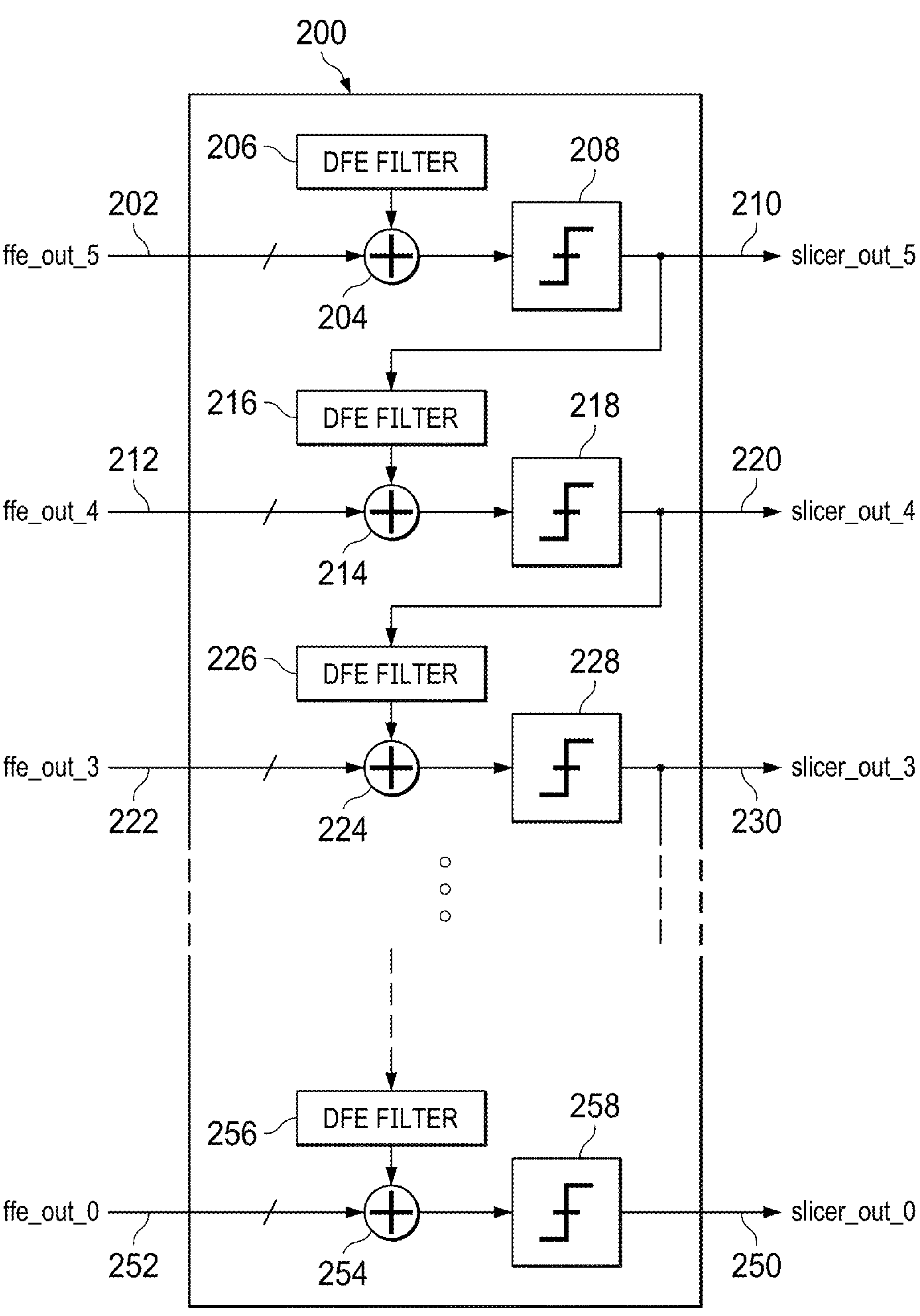
FIG. 2 is a block diagram illustrating an example decision feedback equalizer having a parallel input.

FIG. 2 is a block diagram illustrating an example of a parallel DFE 200. A serial-to-parallel converter (not shown) is implemented prior to DFE 200, so the symbol data input to DFE 200 is in a parallel format. FIG. 2 shows an example of a six path parallel DFE, which corresponds to six consecutive serial symbols converted to parallel (e.g. parallel paths, ffe_out_0 through ffe_out_5, where ffe_out_0 is the current symbol and ffe_out_5 is the fifth previous symbol received). While the example of FIG. 2 shows six parallel paths, more or less paths may be chosen in other implementations. Inputs ffe_out_0 through ffe_out_5 may include a single conductor or a bus including multiple conductors.

The signal ffe_out_0 252 is the symbol input for the current clock cycle. The signal ffe_out_3 222 is the input for the symbol three clock cycles prior to the current clock cycle. The signal ffe_out_5 202 is the input for the symbol five clock cycles prior to the current clock cycle. DFE filters 206, 216, 226 and 256 are functionally equivalent to DFE filter 150 from FIG. 1. Slicers 208, 218, 228 and 258 are functionally equivalent to slicer 120 from FIG. 1. The symbol inputs, adders, DFE filters and slicers for the symbols two clock cycles and one clock cycle prior to the current clock cycle are not shown in FIG. 2 for clarity.

The signal ffe_out_5 202 is input to adder 204 together with the output of DFE filter 206 which is subtracted from ffe_out_5 202. The output of adder 204 is input to slicer 208. The output 210 of slicer 208, slicer_out_5, is then input to DFE filter 216. The output of DFE filter 216 is subtracted from ffe_out_4 212 using adder 214. The output of adder 214 is input to slicer 218. The output 220 of slicer 218, slicer_out_4, is input to DFE filter 226 where it is subtracted from ffe_out_3 222 using adder 224. The output of adder 224 is input to slicer 228. The output 230 of slicer 228, slicer_out_3, is input to a DFE filter whose output will be subtracted from ffe_out_2 (not shown).

The decision output symbol for one clock cycle prior to the current clock cycle, slicer_out_1, is input to DFE filter 256 where it is subtracted from ffe_out_0 252 using adder 254. The output of adder 254 is input to slicer 258. The output 250 of slicer 258 is slicer_out_0, the value of the current symbol. The output of DFE 200 is slicer_out_0.

The value of the current symbol slicer_out_0 depends upon the symbol decision output from each of the five paths computed during the same clock cycle. To compute slicer_out_0, five previous symbols are being calculated in the same clock cycle, and the sixth previous symbol comes from the previous clock cycle. Whereas in computing slicer_out_5, all six of the symbols are coming from the previous clock. During any given clock cycle, the symbol data for the current clock cycle is the only new information because the previous symbol values are already known at the beginning of the clock cycle.

At start up, there is no value for slicer_out_1 until slicer_out_2 is computed. Slicer_out_2 has to wait for slicer_out_3 to be computed before it can be computed. Only when slicer_out_5 is computed, can slicer out slicer_out_4 be computed, and then slicer_out_3 can be computed, then slicer_out_2, slicer_out_1, and finally slicer_out_0. Slicer_out_0 must wait until all the previous paths are computed before a final decision value can be found. This cascade of operations and the accompanying high number of computations per cycle can make meeting the timing requirements of gigabit Ethernet challenging.

Figure 3:
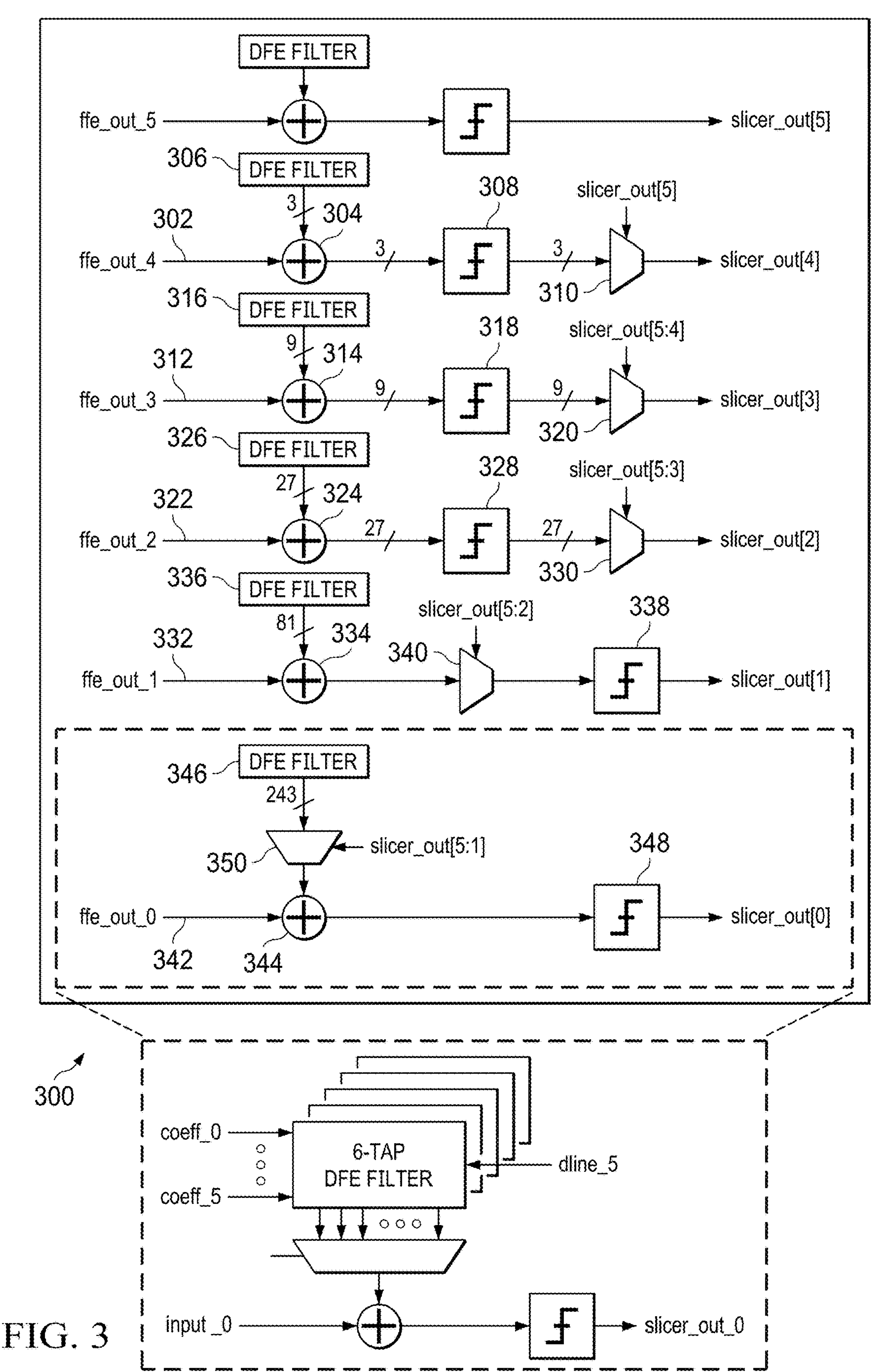
FIG. 3 is a block diagram illustrating an example of a 6-tap parallel DFE having an architecture for performing a portion of the computations simultaneously.

FIG. 3 is a block diagram illustrating an example 300 of a 6-tap parallel DFE having an architecture for performing a portion of the computations simultaneously, rather than all the computations being performed sequentially. The simultaneous performance of computations brings an improvement in the time required to complete the computations. As in the example of FIG. 2, the value of the current symbol slicer_out_0 depends upon the symbol decision output from each of the five paths for the same clock cycle. Likewise, the value of each slicer output depends upon the value of the slicer output for the previous clock cycle.

There are three possibilities for each of the slicer outputs: 1, 0, or −1. One possibility is to have three separate DFE filters each assume one of the values and calculate the output based on the previous slicer output being the assumed value. Each of the DFE outputs would be input to a slicer. The output of each slicer is input to a multiplexer. On the next clock cycle, the slicer output for all previous clock cycles are known and can be connected to the control terminal of a multiplexer to select which of the multiplexer inputs to choose as the slicer output for that path. Each possible value of 1, 0 or −1 for each combination has a separate DFE and slicer. This cascade of computations continues such that for a 6-tap DFE, the last stage has 243 ($3^5$) DFE filters and 243 slicers. The DFE filters, adders and slicers shown in FIG. 3 are functionally equivalent to the DFE filters, adders and slicers shown in FIG. 2.

The signal ffe_out_4 302 is input to adder 304 together with the outputs of the three DFE filters 306, one for each possibility of a 1, 0, or −1 value for slicer_out(5). Each of the three outputs from DFE filters 306 are subtracted from ffe_out_4 302 at adder 304. The outputs of adder 304 are input to slicers 308. The outputs of slicers 308 are input to multiplexer 310. Slicer_out(5) is input to the control terminal of multiplexer 310 and selects which one of the three inputs is connected to the output of multiplexer 310. The output of multiplexer 310 is slicer_out(4).

Similarly, the signal ffe_out_3 312 is input to adder 314 together with the outputs of the DFE filters 316. However, in this case, there are nine DFE filters 316 instead of three, one for each possible combination of a 1, 0, or −1 value for each of slicer_out(5) and slicer_out(4). Each of the nine outputs from DFE filters 316 are subtracted from ffe_out_3 312 at adder 314. The outputs of adder 314 are input to slicers 318. The outputs of slicers 318 are input to multiplexer 320. Slicer_out(4) and slicer_out(5) are input to the control terminal of multiplexer 320 and are the selection bits that select which one of the nine inputs is connected to the output of multiplexer 320. The output of multiplexer 320 is slicer_out(3).

Similarly, the signal ffe_out_2 322 is input to adder 324 together with the outputs of the DFE filters 326. In this case, there are 27 DFE filters 326, one for each possible combination of a 1, 0, or −1 value for each of slicer_out(5), slicer_out(4) and slicer_out(3). Each of the 27 outputs from DFE filters 326 are subtracted from ffe_out_2 322 at adder 324. The outputs of adder 324 are input to slicers 328. The outputs of slicers 328 are input to multiplexer 330. Slicer_out(3), slicer_out(4) and slicer_out(5) are input to the control terminal of multiplexer 330 and are the selection bits that select which one of the 27 inputs is connected to the output of multiplexer 330. The output of multiplexer 330 is slicer_out(2).

The signal ffe_out_1 332 is input to adder 334 together with the outputs of the DFE filters 336, which includes 81 DFE filters. Each of the 81 outputs from DFE filters 336 are subtracted from ffe_out_1 332 at adder 334. The outputs of adder 314 are input to multiplexer 340. Slicer_out(2), slicer_out(3), slicer_out(4) and slicer_out(5) are input to the control terminal of multiplexer 340 and selects which one of the 81 inputs is connected to the output of multiplexer 340. The output of multiplexer 340 is input to slicer 338. The output of slicer 338 is slicer_out(1). The circuitry for the path receiving signal ffe_out_1 is in a different order than the previous paths (signal ffe_out_2-4) to illustrate that the multiplexer and slicer can be placed in either order to balance the critical path timing and the silicon area overhead due to circuit replication.

The signal ffe_out_0 342 is input to adder 344 together with the output of multiplexer 350. The inputs to multiplexer 350 are each of the 243 outputs from the 243 DFE filters 346. Slicer_out(1), slicer_out(2), slicer_out(3), slicer_out(4) and slicer_out(5) are input to the control terminal of multiplexer 350 and determines which of the 243 inputs is selected for the output. The output of multiplexer 350 is input to adder 344. The output of adder 344 is input to slicer 348. The output of slicer 348 is slicer_out(0). In a six tap DFE filter, five of the tap outputs (slicer_out(0) through slicer_out(4)) come from the current clock, while one of the outputs (slicer_out(5)) comes from the previous clock.

The parallel computing DFE shown in FIG. 3 saves computing time and helps to meet the timing requirement for gigabit Ethernet, but at the cost of more silicon area and higher power dissipation for the replicated circuits. The 243 DFE filters required for computing slicer_out(0) alone requires a significant amount of power and area. In the example of FIG. 3, only one of the symbols used to compute slicer_out(0) came from the previous clock signal. Most of the signals do not change with every clock signal, but instead remain constant. The signals that remain constant depend only upon the coefficient value, so they should only need to be updated when the coefficient value changes.

Figure 4:
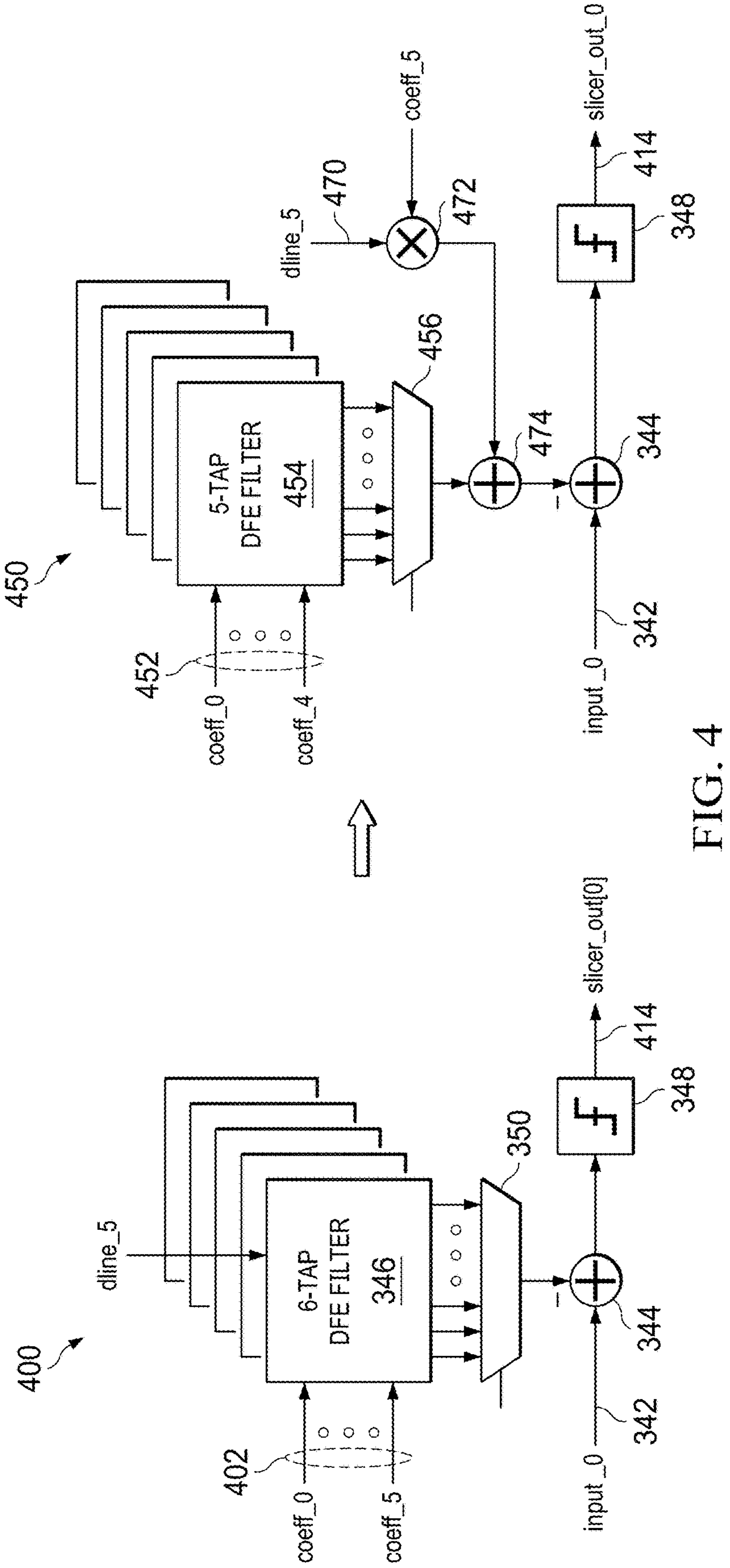
FIG. 4 is a block diagram illustrating an example of a 6-tap parallel DFE where a pseudo-static portion is separated from a dynamic portion.

FIG. 4 is a block diagram illustrating an example of a 6-tap parallel DFE where a pseudo-static portion is separated from a dynamic portion. The results for the pseudo-static portion are calculated separately, and then later added to the dynamic portion coming from input_0, which is toggling. The dynamic and pseudo-static results are summed together and then sliced, resulting in slicer_out_0.

DFE 400 is a more detailed view of the final stage of DFE 300. DFE 400 includes 6-tap DFE filter 346 having coefficient_0 through coefficient_5 402 as inputs and having 243 outputs, each of which is an input to multiplexer 350, which is controlled by slicer_out_1 through slicer_out_5. The output of multiplexer 350 is input to adder 344 where it is subtracted from input_0 342. The output of adder 444 is input to slicer 348. The output of slicer 348 is slicer_out_0 414.

The outputs of five of the six taps in DFE 400 are the set of 243 possible combinations of 1, −1, and 0 values for the signals. These outputs are pseudo-static. Only one of the six taps changes (i.e. dynamic). DFE 450 illustrates a lower power alternative to DFE 400.

DFE 450 includes 5-tap DFE filter 454 having coefficient_0 through coefficient_4 452 as inputs. The outputs of DFE filter 454 are input to multiplexer 456, which is controlled by slicer_out_1 through slicer_out_5. If coefficient_0 through coefficient_4 452 do not change, the 243 DFE filter outputs will not change. In many cases, coefficient_0 through coefficient_4 452 only change periodically after an initial power-up/reset training sequence. If coefficient_0 through coefficient_4 452 do not change from one clock cycle to the next, it is unnecessary to recalculate the DFE filter outputs each clock cycle. The output of the sixth tap, input_5 470, is multiplied by coefficient_5 at multiplier 472.

The output of multiplexer 456 is input to adder 474 where it is summed with the output of multiplier 472. The output of adder 474 is subtracted from input_0 342 at adder 344. The output of adder 344 is input to slicer 348. The output of slicer 348 is slicer_out_0 414.

The five-tap filter and the output of the one changing tap are separated in DFE 450. None of the input symbols are changing, so the output of the five-tap filter is only dependent upon the coefficients, which in this case, are not changing. The pseudo-static and dynamic portions are computed separately, and are later added together. By separating the pseudo-static and dynamic portions, power is saved by only calculating five of the six taps when there is a change in coefficients coeff_0 through coeff_4.

Coefficients coeff_0 through coeff_4 do not always remain constant. The coefficients are calculated at system start-up/reset using a least mean square (LMS) error algorithm. Once the system start-up/reset is complete, the coefficients infrequently change, usually due to temperature, aging or environmental effects. During system start-up/reset, which can take less than 100 msec in some cases, the pseudo-static calculations are updated every clock cycle. However, once the system start-up/reset is complete, the update rate may be reduced to a lower rate, for example, once every 16 or 32 clock cycles. A tradeoff can be made between more frequent updates with higher power consumption and less frequent updates with lower power consumption.

Figure 5:
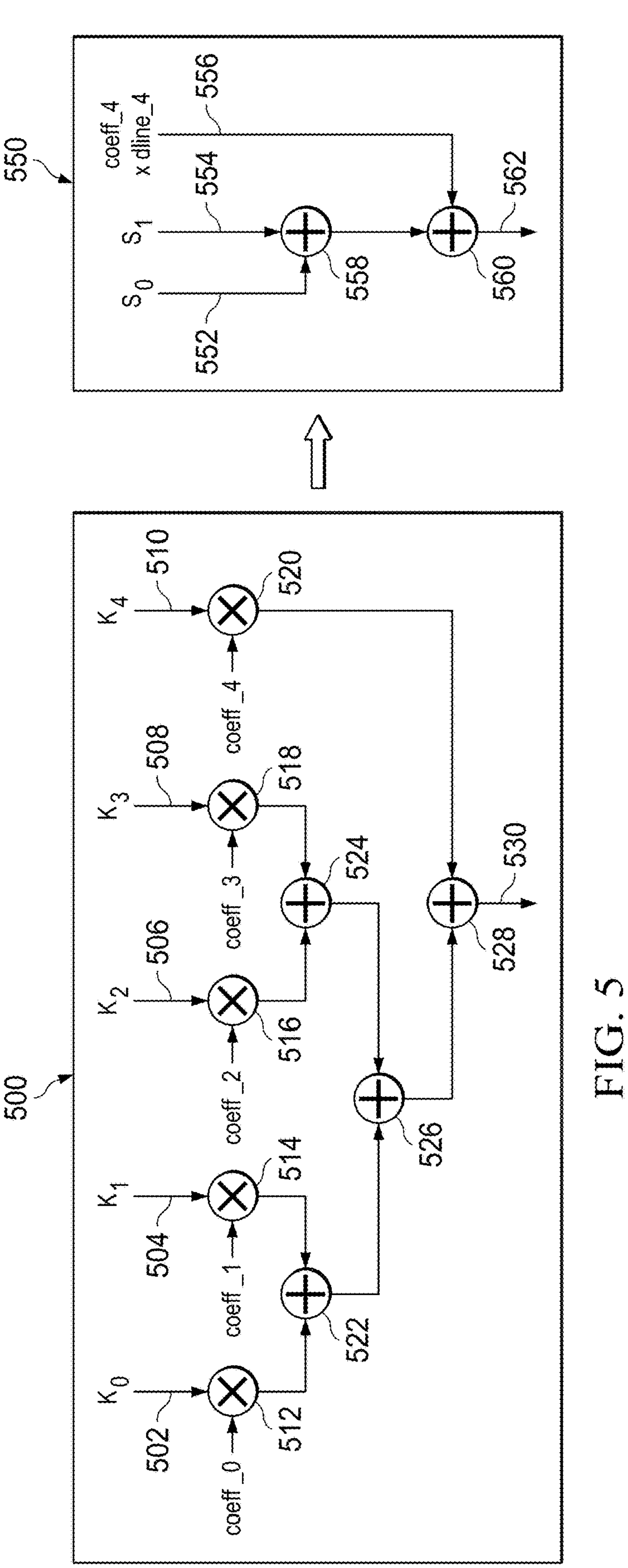
FIG. 5 is a block diagram illustrating an implementation for a 5-tap DFE filter for which the input values are constant, and only the coefficients change.

FIG. 5 is a block diagram illustrating an implementation for a 5-tap DFE having 243 DFE filters for which the input values are constant, and only the coefficients are changing. FIG. 5 shows the pseudo-static path of the sixth arm, and a similar structure can be used for the other arms as well.

The inputs to filter 500 are symbols $K_0$ 502, $K_1$ 504, $K_2$ 506, $K_3$ 508, and $K_4$ 510. $K_0$ 502 is multiplied by coeff_0 at multiplier 512. $K_1$ 504 is multiplied by coeff_1 at multiplier 514. $K_2$ 506 is multiplied by coeff_2 at multiplier 516. $K_3$ 508 is multiplied by coeff_3 at multiplier 518. $K_4$ 510 is multiplied by coeff_4 at multiplier 520.

The outputs of multipliers 512 and 514 are summed using adder 522. The outputs of multipliers 516 and 518 are summed using adder 524. The outputs of adders 522 and 524 are summed using adder 526. The output of adder 526 is summed with the output of multiplier 520 to provide the final output 530. The symbol values are multiplied by their respective coefficients and summed to give the filter output.

In the embodiment of filter 500, two coefficients are combined to generate nine partial sums, then the final sum is computed using the elements from the partial sums. Because K0 502 and K1 504 can each take one of three values, the output of adder 522 can be any one of nine different values. All nine values are computed and provided to the 243 filters as an input. Likewise, because K2 506 and K3 508 can each take one of three values, the output of adder 524 can be any one of nine different values. All nine values are computed and provided as an input to the 243 filters. Splitting the calculations into partial sums that are reused by the 243 filters saves silicon area and power dissipation.

The embodiment of filter 550 further reduces silicon area required and power dissipation in comparison to the embodiment of filter 550. In the embodiment of filter 550, the calculations performed by multipliers 512, 514, 516 and 518, and the calculations performed by adders 522 and 524 are performed outside the filter and then provided to the filter.

$$S_0=K_0*\text{coeff\_0}+K_1*\text{coeff\_1} \text{ where } K_0,K_1\in\{1,0,-1\}$$

$$S_1=K_2*\text{coeff\_2}+K_3*\text{coeff\_3} \text{ where } K_2,K_3\in\{1,0,-1\}$$

$$\text{Sum}=S_0+S_1+K_4*[\![\text{Coeff}]\!]\_4 \text{ where } K_4\in\{1,0,-1\}$$

There are nine possible values for $S_0$ 552 and $S_1$ 554. So 552 and $S_1$ 554 are summed using adder 558. The output of adder 558 is summed with the product 556 of $K_4$ and coeff_4 using adder 560 to provide the final output 562.

There are 243 possible outputs in the final sum that are a combination of $S_0$, $S_1$ and coeff_4*$K_4$. Instead of repeating these calculations 243 times, the 5 tap filter receives them directly. In the embodiment of filter 500, five multipliers and four adders are needed. In the embodiment of filter 550, with $S_0$ and $S_1$ computed outside the filter, only one multiplier and two adders are required in each filter.

Other partial sum combinations are possible. For example, another embodiment is to combine the calculations for three symbols in a first adder and two symbols in a second adder, resulting in partial sums of 27 values and 9 values, respectively. Combinations for more or less than five taps are also possible.

Figure 6:
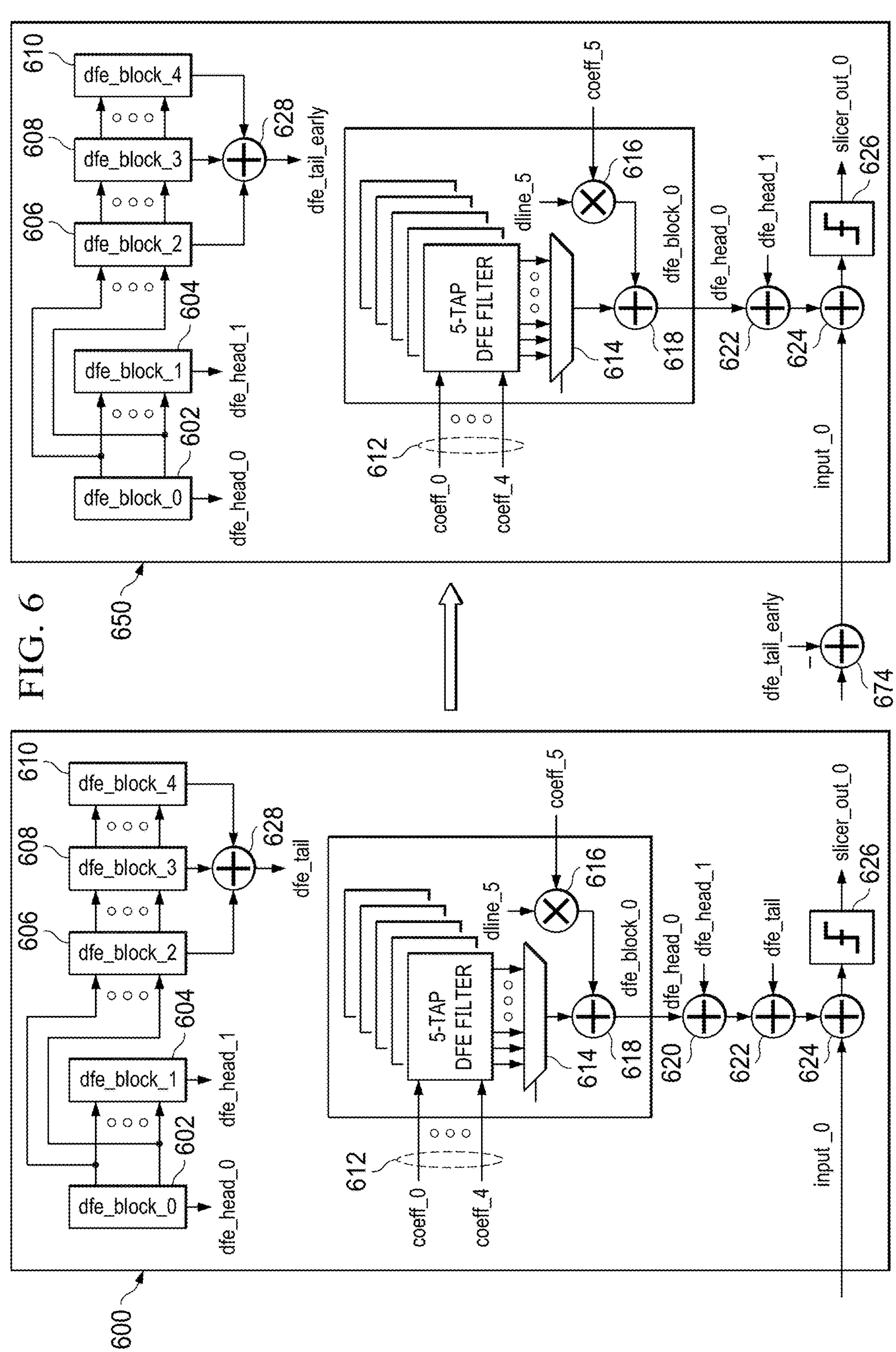
FIG. 6 is a block diagram illustrating a 30-tap DFE filter having an architecture to provide a reduction in silicon area and power dissipation.

The number of taps needed in a DFE filter to achieve acceptable signal quality depends on several factors including the channel type and the cable being used. FIG. 6 is a block diagram illustrating a 30-tap DFE filter 600 having an architecture to provide a reduction in silicon area and power dissipation. The 30 taps of DFE filter 600 are partitioned into five blocks having six taps each. The five blocks are pipelined such that dfe_block_0 602 generates six symbols that are input to dfe_block_1 604 as an input, and dfe_block_1 604 generates six symbols that are input to dfe_block_2 606, and so on. Each of the five blocks contain the circuitry for and performs the calculations of a 6-tap DFE filter.

The output of dfe_block_0 602 is dfe_head_0. The output of dfe_block_1 604 is dfe_head_1. The outputs of the last 3 blocks, dfe_block_2 606, dfe_block_3 608, and dfe_block_4 610, are summed together at adder 628. The output of adder 628 is dfe_tail.

The value of dfe_head_0 depends upon symbols during the current clock cycle, so it can only be calculated in the current clock cycle. The value of dfe_head_1 depends upon symbols during the previous clock cycle. However, dfe_tail only needs the symbols from two (or more) clock cycles earlier for its calculations, so the required symbols are available for calculations at least one clock cycle early. By calculating the sum of the outputs of dfe_block_2 606, dfe_block_3 608, and dfe_block_4 610 one clock cycle early, the computational load for the current clock cycle is reduced.

The output of dfe_head_0 is summed with the output of dfe_head_1 using adder 620. The output of adder 620, which is the sum of dfe_head_0 and dfe_head_1, is summed with dfe_tail using adder 622. The output of adder 622 is subtracted from input_0, and the result of that subtraction is input to slicer 626. The output of slicer 626 is the final result, slicer_out_0.

DFE filter 650 illustrates an even further reduction in silicon and power required for a 30-tap DFE filter. As with DFE filter 600, the 30 taps of DFE filter 650 are partitioned into five blocks having six taps each. The five blocks are pipelined such that dfe_block_0 602 generates six symbols and those six symbols are input to dfe_block_1 604 as an input, and dfe_block_1 604 generates six symbols that are input to dfe_block_2 606, and so on. Each of the five blocks contain the circuitry for and performs the calculations of a 6-tap DFE filter.

The output of dfe_block_0 602 is dfe_head_0. The output of dfe_block_1 604 is dfe_head_1. The outputs of the last 3 blocks, dfe_block_2 606, dfe_block_3 608, and dfe_block_4 610, are summed together at adder 628. The output of adder 628 is dfe_tail_early.

The output of dfe_block_0 is input to adder 622 where it is summed with dfe_head_1. The output of adder 622 is input to adder 624 to be subtracted from the input signal.

Because the sum of dfe_block_2 606, dfe_block_3 608, and dfe_block_4 610 can be computed one clock cycle prior to the current clock cycle, the subtraction of their sum from the input signal can be done one clock cycle earlier using adder 674, which is outside the DFE filter. Adder 674 subtracts dfe_tail_early from the input symbol. The output of adder 674, input_0, is input to adder 624 where the output of adder 620 is subtracted from it. The output of adder 624 is input to slicer 626. The output of slicer 626 is the final result, slicer_out_0.

The architecture of DFE filter 650 does not reduce the total number of required adders in comparison to DFE filter 600, but moves a subtraction computation to the previous clock cycle, thus reducing the computational timing challenge by moving an adder out of the path and eliminating replicated logic in the DFE filter.

For the purposes of this disclosure, if an element is referred to as being "coupled" to another element, as used herein, it is intended that there is a functional connection (e.g. a direct connection or an indirect connect where one or more intervening elements exist) between the two elements. If a first element is referred to as being "directly coupled" to a second element, no intervening elements are between the first and second elements. The terms "substantially the same," "substantially equal," "approximately equal," and "approximately the same" describe a quantitative relationship between two objects. This quantitative relationship may prefer the two objects to be equal by design but with the anticipation that a certain amount of variations can be introduced by the fabrication process.

As used herein, the terms "terminal", "node", "interconnection", "lead" and "pin" are used interchangeably. Unless specifically stated to the contrary, these terms are generally used to mean an interconnection between or a terminus of a device element, a circuit element, an integrated circuit, a device or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While operations are depicted as occurring in a particular order, this should not be understood as requiring that all illustrated operations be performed, or that the operations are required to be performed in that order to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. An electronic circuit comprising:
a first adder having a first input configured to receive a first symbol of a plurality of symbols;
a first filter circuit having a plurality of inputs and a plurality of outputs coupled to a plurality of second inputs of the first adder, wherein each input of the plurality of inputs is configured to have one of three values, and each output of the plurality of outputs is configured to provide an output that corresponds to a member of a set of possible combinations of the inputs of the first filter circuit;
a first slicer circuit having inputs coupled to outputs of the first adder;
a first multiplexer having inputs coupled to outputs of the first slicer circuit;
a second adder having a first input configured to receive a second symbol of the plurality of symbols;
a second filter circuit having a plurality of outputs coupled to a plurality of second inputs of the second adder, wherein each output of the plurality of outputs of the second filter circuit is configured to provide an output that corresponds to a member of a set of possible combinations of the inputs of the second filter circuit;
a second slicer circuit having inputs coupled to outputs of the second adder; and
a second multiplexer having inputs coupled to outputs of the second slicer circuit.

2. The electronic circuit of claim 1, wherein the first and second slicer circuits are configured to assign one of the three values to the outputs of the first and second slicer circuits responsive to the inputs of the first and second slicer circuits, respectively.

3. The electronic circuit of claim 1, wherein the second multiplexer includes control inputs coupled to outputs of the first multiplexer.

4. The electronic circuit of claim 1, wherein the inputs of the first and second filter circuits include each possible combination of outputs from the first multiplexer.

5. The electronic circuit of claim 1, additionally comprising:
an N-bit parallel input configured to receive the plurality of symbols transmitted at a rate of one symbol per cycle during a current clock cycle and each of previous (N−1) clock cycles, wherein N is an integer equal to or greater than 5;
a current adder having a first input configured to receive a symbol from the current clock cycle;
a current filter circuit having a plurality of outputs, wherein each output of the plurality of outputs of the current filter circuit is configured to provide an output that corresponds to a member of a set of possible combinations of the inputs of the current filter circuit;
a current multiplexer having inputs coupled to the plurality of outputs of the current filter circuit; and
a current slicer having an input coupled to an output of the current adder.

6. The electronic circuit of claim 5, wherein an output of the current multiplexer is coupled a second input of the current adder.

7. The electronic circuit of claim 1, wherein the plurality of symbols is consecutive communication symbols.

8. The electronic circuit of claim 1, further comprising a decision feedback equalizer (DFE) that comprises the first and second adders, the first and second slicer circuits, and the first and second multiplexers.

9. The electronic circuit of claim 1, further comprising an N-bit parallel input configured to receive the plurality of symbols transmitted at a rate of one symbol per cycle during a current clock cycle and each of previous (N−1) clock cycles, wherein N is an integer equal to or greater than 5.

10. The electronic circuit of claim 1, further comprising:
a third adder having a first input configured to receive a third symbol of the plurality of symbols;
a third filter circuit having a plurality of outputs, wherein each output of the plurality of outputs of the third filter circuit is configured to provide an output that corresponds to a member of a set of possible combinations of the inputs of the third filter circuit;
a third multiplexer having inputs coupled to the plurality of outputs of the third filter circuit, and an output coupled to a second input of the third adder; and
a third slicer having an input coupled to an output of the third adder.

11. The electronic circuit of claim 10, wherein the third multiplexer includes control inputs coupled to outputs of the second multiplexer.

12. The electronic circuit of claim 11, wherein the second multiplexer includes control inputs coupled to outputs of the first multiplexer.

13. The electronic circuit of claim 10, wherein the third filter circuit is a 6-tap filter.

14. A decision feedback equalizer (DFE) comprising:
a first adder having a first input configured to receive a first symbol of a plurality of symbols;
a first filter circuit having a plurality of outputs coupled to a plurality of second inputs of the first adder;
a first slicer circuit having inputs coupled to outputs of the first adder;
a first multiplexer having inputs coupled to outputs of the first slicer circuit;
a second adder having a first input configured to receive a second symbol of the plurality of symbols;
a second filter circuit having a plurality of outputs coupled to a plurality of second inputs of the second adder;
a second slicer circuit having inputs coupled to outputs of the second adder; and
a second multiplexer having inputs coupled to outputs of the second slicer circuit, wherein the second multiplexer includes control inputs coupled to outputs of the first multiplexer.

15. The DFE of claim 14, further comprising:
a third adder having a first input configured to receive a third symbol of the plurality of symbols;
a third filter circuit having a plurality of outputs;
a third multiplexer having inputs coupled to the plurality of outputs of the third filter circuit, and an output coupled to a second input of the third adder; and
a third slicer having an input coupled to an output of the third adder.

16. The DFE of claim 15, wherein the third multiplexer includes control inputs coupled to outputs of the second multiplexer.

17. The DFE of claim 14, wherein the first and second slicer circuits are configured to assign one of three values to the outputs of the first and second slicer circuits responsive to the inputs of the first and second slicer circuits, respectively.

18. The DFE of claim 14, wherein the inputs of the first and second filter circuits include each possible combination of outputs from the first multiplexer.

19. The DFE of claim 14, wherein the plurality of symbols is consecutive communication symbols.

* * * * *